Jan. 10, 1950

R. E. PROUTY 2,493,899

CIRCUIT CONTROL SWITCH

Filed June 20, 1946

Inventor:
Robert E. Prouty.
By Brown Jackson Boettcher Dienner
Attys.

Jan. 10, 1950

R. E. PROUTY

2,493,899

CIRCUIT CONTROL SWITCH

Filed June 20, 1946

Inventor:
Robert E. Prouty.
By Brown Jackson Boettcher Dienner
Attys

Patented Jan. 10, 1950

2,493,899

UNITED STATES PATENT OFFICE 2,493,899

CIRCUIT CONTROL SWITCH

Robert E. Prouty, Logansport, Ind., assignor, by mesne assignments, to Essex Wire Corporation, Logansport, Ind., a corporation of Michigan Application June 20, 1946, Serial No. 678,013

14 Claims. (Cl. 200—122)

My present invention relates to an improvement in circuit control switches, and more particularly to switches embodying thermally responsive means for controlling actuation of the switches in opening and closing a plurality of circuits.

The switch of my present invention has particular utility in controlling the operation of an electric motor having a starting winding and a running winding in which it is desired to open the circuit of the starting winding after the motor has reached sufficient speed to continue running upon energization of the running winding only. However it will be understood that the switches of my invention have utility generally for controlling a plurality of circuits and are not limited to use with electric motors.

As above indicated in the operation of electric motors it is desirable to provide a switch for effecting opening of the circuit of a starting winding after the motor has reached a predetermined speed, and in which the switch is thereafter operable to function as a circuit breaker to open the running winding in the event of an overload.

Switches of the above character are known in the part and my present invention is concerned with providing a switch of this type having a thermally responsive member, such as a bimetal blade, operable depending upon current flow through the switch to effect opening of one set of contacts associated for example with the starting winding circuit of an electric motor, and a second set of contacts associated, for example, with the running winding circuit adapted to be opened in response to movement of the bimetal blade upon overload.

It is an object of my invention to provide a switch of the character noted which is of simple construction and low cost.

A further object is to provide a switch of the character noted which comprises a thermally responsive member, a plurality of contacts for controlling a plurality of circuits, and single magnetic means associated with the thermally responsive member and certain of the contacts for effecting snap opening of the contacts in opening of the circuits.

A further object of my invention is to provide a switch as last noted in which the plurality of contacts for the plurality of circuits normally have spring loaded engagement with each other and upon separation thereof by movement of the thermally responsive member the spring loading between the contacts effects breaking of the arc therebetween.

A still further object is to provide a switch having a plurality of contacts for controlling a plurality of circuits in which the contacts are adapted to be caused to be opened and closed with a snap action in predetermined sequence by means of a thermally responsive member and magnetic means associated with the latter and certain of the contacts.

I propose to achieve the aforesaid objects by providing a switch comprising a base member of insulating material upon which a thermally responsive member, such as a bimetal blade, is mounted at one end by means of a suitable bracket secured to the base member. The other or free end of the bimetal blade has a permanent magnet fixed thereto and in addition in the preferred embodiment of my invention carries a pair of movable contacts. A second pair of contacts are provided and are adapted to have engagement one each with the movable contacts carried by the bimetal blade by means of the magnetic attraction of the magnet for the second pair of contacts. In the preferred embodiment of my invention one of the contacts of the second pair of contacts is stationarily mounted with respect to the base member and the other contact of the second pair of contacts is carried by an armature forming a contact carrying member at the free end of a leaf spring member fixed at its other end to a second bracket suitably secured to the base member. The bimetal blade is arranged so that when it is heated by current flow therethrough the free end thereof tends to flex in a direction away from the second pair of contacts but is tended to be restrained from such movement by the attraction of the magnet for portions of the members supporting the second pair of contacts. However, when the force of the bimetal blade overcomes the magnet attraction of the magnet for the supporting member of the stationary contact of the second pair of contacts, the one movable contact of the first pair of contacts is caused to be separated from the stationary contact with a snap action. In the embodiment of the switch with an electric motor this movement of the bimetal blade may be utilized to effect opening of the starting winding circuit. It will be remembered that the other of the second pair of contacts is carried by a contact carrying member having connection with a leaf spring member and the magnetic attraction of the magnet for the contact carrying member is sufficient to overcome the force of the leaf spring so that the movable contact carried thereby remains in engagement with the other of the pair of movable contacts carried by the bimetal blade. However upon flow of predetermined overload current through the switch the bimetal blade flexes further away, and the contact carrying member associated with the leaf spring engages suitable stop means carried by the base which prevents further movement thereof and the contact carried by it. Then upon further flexing of the bimetal blade the magnetic attraction of the permanent magnet for the contact carrying member associated with the leaf spring is overcome and the engaged contacts open with a snap action opening the circuit with which they are associated. As disclosed in the instant application the latter contacts may be associated with the running winding of an electric motor to protect it against overload.

A preferred feature of my present invention resides in the provision of a leaf spring contactor member fixed to the free end of the bimetal blade and having curved end portions each of which carry one of the pair of movable contacts, and which end portions provide spring loaded engagement of the contacts carried thereby with the second pair of contacts by means of the attraction of the magnet at the free end of the bimetal blade for the contact carrying members of the second pair of contacts.

A further preferred feature resides in the provision of a permanent magnet at the free end of the bimetal blade having a groove therein extending in a direction lengthwise of the bimetal blade and within which the curved end portions of the leaf spring contactor member are adapted to be biased inwardly to provide spring loaded engagement of the contacts at the ends thereof with the second pair of contacts.

A further preferred feature resides in providing the bracket member to which one end of the leaf spring member associated with the second of the second set of contacts is fixed with a stop portion or shoulder for limiting the position of the contact associated with the leaf spring member away from the base member, and serving upon cooling of the bimetal blade and return thereof to normal position to effect engagement of the one movable contact of the first pair of contacts with the stationary contact of the second pair of contacts prior to engagement of the other of the first pair of contacts with the contact carried by the leaf spring member.

A still further preferred feature resides in the provision of adjusting means carried by the bracket to which the one end of the bimetal blade is secured for adjusting the latter.

A still further preferred feature resides in the provision of a heater wire having connection with the bracket to which one end of the bimetal blade is secured and in underlying relation with respect to the latter to effect rapid operation of the switch in response to current flow therethrough.

The above and other objects, advantages, and features of my present invention will appear from the detail description.

Now in order to acquaint those skilled in the art with the manner of constructing and utilizing switches in accordance with my present invention, I shall describe in connection with the accompanying drawings a preferred embodiment of my invention.

Figure 13:
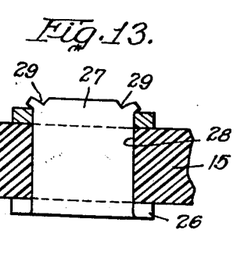
Figure 13 is a detail vertical sectional view taken substantially on the line 13—13 of Figure 7 looking in the direction indicated by the arrows and illustrating the manner in which each of the several terminals are secured in the base member of the switch.

Referring now to the drawings, I have shown a switch 14 constructed in accordance with my present invention which comprises a base plate or member 15 formed of suitable insulating material and preferably of molded high impact "Bakelite" so that it is of good mechanical strength and not subject to warping. The base member 15 is disposed within an elongated substantially cup-shaped housing 16 also preferably formed of a suitable insulating material such as "Bakelite," with the enclosing housing 16 inwardly of its open end being provided with a shoulder 17 against which the edge of the base member is caused to be seated. The base member 15 is provided with a plurality of terminals 19 through 26 each of which is formed of a U-shaped stamping and in which the upstanding arm 27—27 of each thereof, as shown more clearly in Figures 7 and 13, extend through suitable conformed rectangular openings 28 in the base member 15, and the upper edges of which are staked as indicated at 29 in Figure 13 to provide for securing to the upper surface of the base member 15 the several parts of the switch as will appear in greater detail hereinafter.

The end walls of the enclosing housing 16 as shown, are provided with grooved notches 30 through which suitable insulated leads extending to circuits to be controlled by the switch are adapted to pass and which provide for clamping of the leads to maintain them in position.

Figure 11:
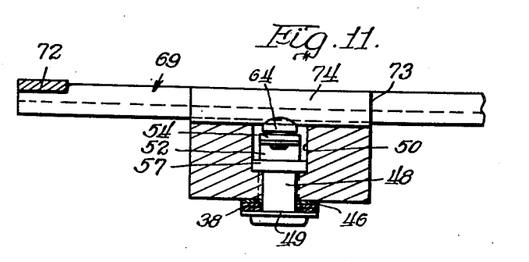
Figure 11 is a fragmentary detail sectional view taken substantially on the line 11—11 of Figure 7 looking in the direction indicated by the arrows.

Referring now more particularly to Figures 7 through 10, the terminal 19 is staked against a terminal lug 32 which has a projecting ear portion 33 to which one end of a heater wire 34 is secured by means of a rivet 35 and clamping washer 36. The other end of the heater wire 34 together with one end of a bimetal blade 38 is suitably secured as by the rivet 39 and clamping washer 40 adjacent the outer end of an arm 42 of a bracket 43, and which bracket 43 is mounted upon the base member by the staked end of the terminal 26 in the manner previously described. An adjusting screw 45 is threaded in the arm 42 of the bracket 43 and the end of the screw bears against the upper surface of the base member 15 to provide for positioning of the arm 42 relative to the base and thereby the secured end of bimetal blade 38 to adjust the tension of the latter. As shown more clearly in Figures 8 and 11 the free or other end of the bimetal blade 38 has a small permanent magnet 46 and a leaf spring contactor member 47 secured thereto by means of a rivet 48 and clamping washer 49. The magnet 46 is provided with a central rectangular slot 50 extending in a direction lengthwise of the bimetal blade 38 and the leaf spring contactor member 47 is provided with curved end portions 52 and 53 the opposite ends of which are provided with a pair of movable button contacts 54 and 55, respectively, secured to the ends thereof as by riveting. As shown, the portion of the leaf spring contactor member between the curved ends 52 and 53 thereof is disposed between the bottom of the magnet and the free end of the bimetal blade 38 with the magnet, and the leaf spring contactor member and the end of the bimetal blade are provided with openings through which the rivet 48 passes. As shown more clearly in Figure 11, the rivet head 57 is flattened off in the groove 50 and into engagement with the side walls thereof which serves to maintain the magnet in position and prevents the same from rotating relative to the bimetal blade 38.

Figure 1:
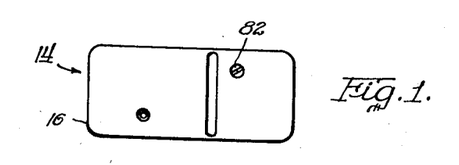
Figure 1 is a plan view of a completed switch and enclosing housing constructed in accordance with my present invention.
Figure 2:
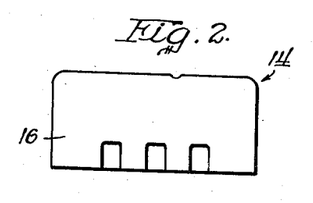
Figure 2 is a side elevational view of the completed switch of Figure 1.
Figure 3:
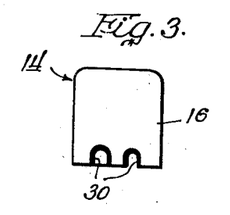
Figure 3 is a left hand end view of the completed switch of Figures 1 and 2.
Figure 4:
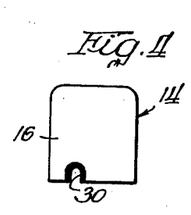
Figure 4 is a right hand end view of the completed switch of Figures 1 and 2.
Figure 5:
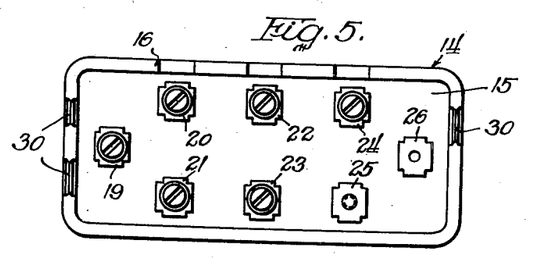
Figure 5 is a bottom full scale view of the completed switch of Figures 1 through 4.
Figure 6:
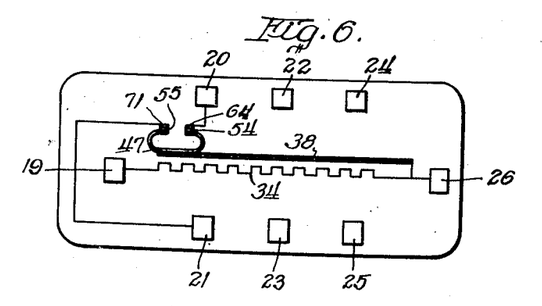
Figure 6 is a diagrammatic view illustrating certain of the elements of the switch of Figures 1 through 5.
Figure 7:
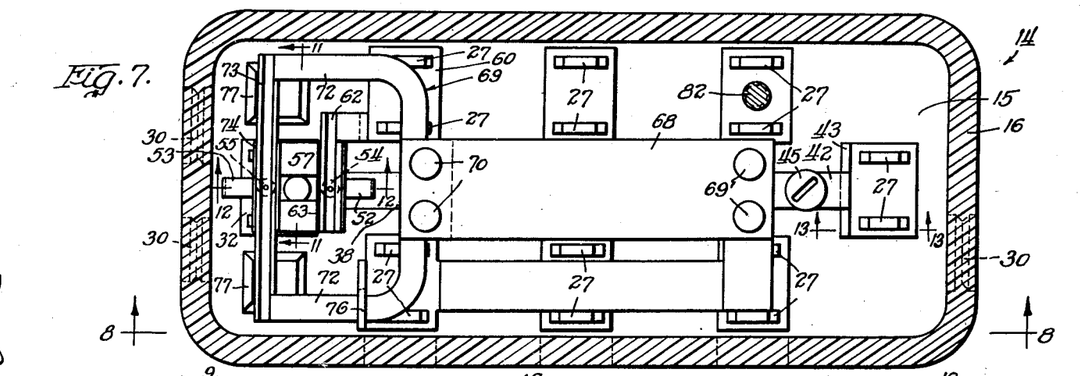
Figure 7 is an enlarged plan view of the switch mechanism showing the enclosing cover for the switch in section, and taken substantially on the line 7—7 of Figure 8 looking in the direction indicated by the arrows.
Figure 8:
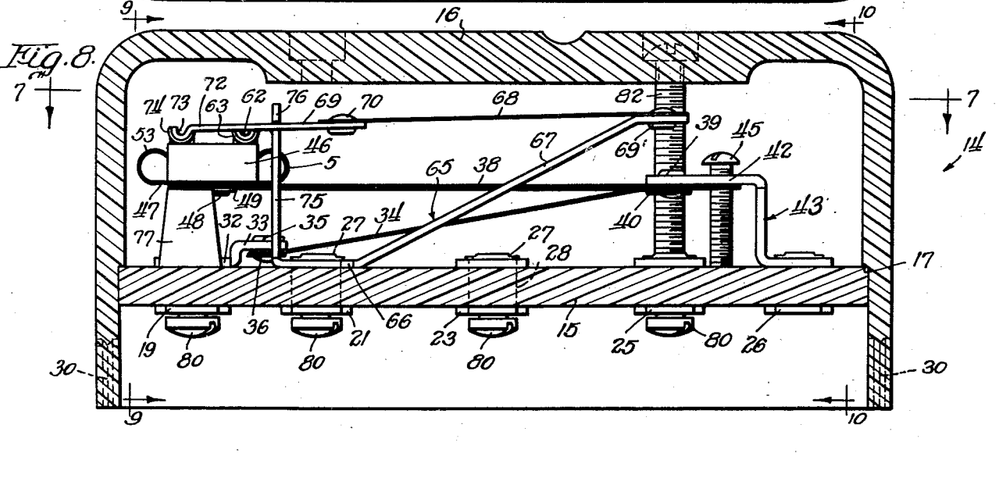
Figure 8 is an enlarged side elevational view of the switch mechanism showing the enclosing housing and base member for supporting the switch parts in section and taken substantially on line 8—8 of Figure 7 looking in the direction indicated by the arrows.
Figure 9:
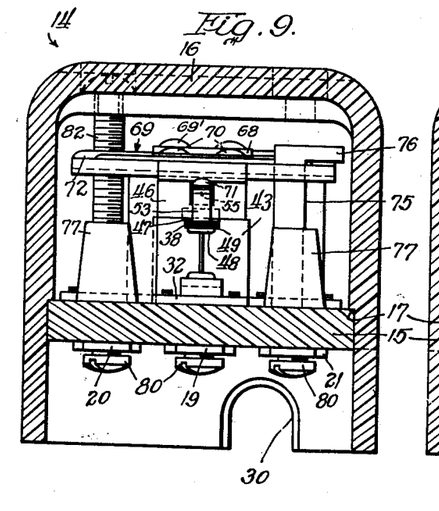
Figure 9 is a vertical sectional view taken substantially on the line 9—9 of Figure 8 looking in the direction indicated by the arrows.
Figure 10:
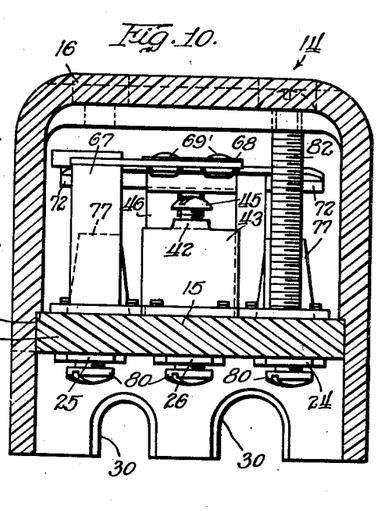
Figure 10 is a vertical sectional view taken substantially on the line 10—10 of Figure 8 looking in the direction indicated by the arrows.

The U-shaped terminal 20 as shown in Figures 7 and 9 provides for securing upon the upper surface of the base member 15 a contact bracket member 60 as by the aforementioned staking of the arms 27—27 of the terminal 20. The contact bracket member 60 is formed with a stationary contact supporting portion 62 of substantially U-shape in cross-section and extending transversely of the free end of the bimetal blade 38. A stationary button contact 64 is secured in the member 62 intermediate the ends of the latter in a position overlying the movable button contact 54 carried by the inner curved end portion 52 of the leaf spring contactor member 47. The bracket 60 is preferably made of magnetic metal although if desired only the contact supporting portion 62 thereof need be of magnetic metal. The face of the contact supporting portion 62 adjacent the permanent magnet 46 is provided with a thin non-magnetic spacer 63 such as of copper to limit the attraction of the magnet 46 for the ferrous contact portion 62 of the stationary contact member 60.

A bracket 65 is also secured to the upper surface of the base member 15 by the U-shaped terminal 21 as by staking of the ends thereof to the portion 66 of the bracket 65. The bracket 65 comprises a diagonally upwardly extending arm portion 67 to one end of which a leaf spring 68 is secured as by riveting with the other end of the leaf spring having an armature member 69 of magnetic metal secured thereto as by the pair of rivets 70—70. The armature 69 comprises a pair of spaced lengthwise extending arms 72—72, the outer ends of which are connected by the integral contact bar or rod portion 73 which extends transversely of the magnet 46 and the free end of bimetal blade 38. The member 73 intermediate the ends thereof carries a button contact 71 in a position overlying the button contact 55 carried at the free end of the outer curved portion 53 of the leaf spring contactor member 47, as will be clear from Figure 12. The transversely extending contact portion 73, like the stationary contact portion 62, is also substantially U-shaped in cross-section, and it is provided with a thin non-magnetic spacer 74, such as of copper, at the portion thereof overlying the magnet 46.

The bracket 65 further comprises a substantially vertically extending arm member 75, which at its upper end is provided with a laterally extending ear 76 which overlies the arm 72 of the armature 69 at the side of the switch to which the bracket 65 is secured to the base.

The base member 15 is provided with a pair of spaced integral upstanding projections 77—77 lying at either side of the magnet 46, and in position to be engaged by opposite ends of the bar contact portion 73 of the armature 69.

The laterally projecting ear 76 of the arm 75 of the bracket 65 provides for limiting the movement of the leaf spring member and armature 69 in a direction away from the permanent magnet 46 and is preferably arranged so that the leaf spring member 68 is slightly pre-stressed tending to urge the armature 69 away from the magnet 46. Also the pair of integral upwardly extending projections 77—77 of the base member provide a stop limiting downward movement of the leaf spring member 68 and the armature 69 carried thereby for a purpose to be described hereinafter.

The U-shaped terminals 19, 20 and 21 are provided in their bottom portions with extruded and tapped openings into which suitable screws shown at 80 may have threaded engagement for the attachment of suitable leads to the switch. Also, in the embodiment shown, terminal 24 is provided with an extruded and tapped hole in its bottom surface with which a screw 82 has threaded engagement with the head of screw 82 seating in a recess formed in the upper wall of enclosing cover 16 for assembling the base 15 and cover 16 together. The remaining terminals are convenience terminals and may or may not be tapped and threaded for the attachment of other leads auxiliary to the circuits controlled by the switch.

Figure 12:
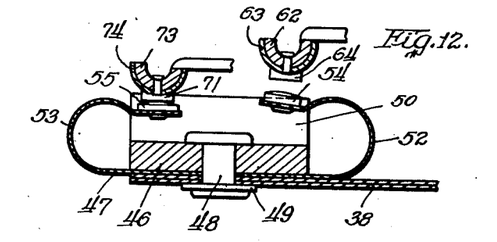
Figure 12 is a fragmentary sectional view showing one pair of contacts of the switch opened and with another of the pair of contacts in closed position and illustrating the manner in which the contacts of the switch are arranged and constructed.

For purposes of describing the mode of operation of the switch above described in detail, let it be assumed that the terminal 19 has connection with a power supply line, the terminal 21 with a circuit including the running winding of an electric motor and the terminal 20 with a circuit including the starting winding of the electric motor. With this connection of the switch 14 with the line and windings of an electric motor, the operation of the device is as follows:

In the normal or motor starting position of the switch as shown in the drawings, it will be observed that line current passes from the terminal 19, to lug 33 and then to the heater wire 34 to the arm 42 of bracket 43 and the secured end of the bimetal blade 38. From the bimetal blade 38 a circuit may be traced through the contactor spring leaf member 47 to the inner curved end 52 thereof, the contact 54, the stationary contact 64 carried by member 62 of the contact bracket 60, to the terminal 20 and then to the starting winding of the electric motor. A circuit may also be traced from the leaf spring contactor member 47 to the curved end 53 thereof, to the contact 55, contact 71 carried by the arm portion 73 of the armature member 69, through the leaf spring member 68, arm 67 of bracket 65, plate portion 66 of the bracket 65, and thence to the terminal 21, which it will be remembered has connection to the running winding of the electric motor. Thus in the position of the switch shown in Figures 7 and 8, both the starting winding and the running winding of an electric motor are energized to effect starting of the motor. Flow of current through the switch in the manner described causes the heater wire 34 to become hot together with the bimetal blade due to its own resistance and to the heat drifting up from the heater wire 34. This tends to cause the bimetal blade 38 to deflect downward from the contact arm 62 of the stationary contact 60, and since the contact 64 cannot follow, the stored tension in the bimetal blade, when it becomes sufficient in amount to overcome the attraction of the magnet 46 for the stationary contact, effects separation of the movable button contact 54 carried by the curved inner end 52 of the leaf spring contactor member 47 from the stationary contact 64 with a snap action thereby opening the circuit of the starting winding for the electric motor. The condition last referred to is shown in Figure 12, and it will be observed that the curved end portion 52, as is the curved end portion 53 of the leaf spring contactor 47, are in the normal position of the device, caused to be biased inwardly of the groove 50 of the permanent magnet 46 to provide spring loaded engagement of the first movable contacts 54 and 55 carried by the bimetal blade 38 with their associated second contacts 64 and 71, respectively, due to the attraction of the permanent magnet 46 for the ferrous contacting supporting members 62 and 73 for the latter pair of contacts. Thus upon flexing of the bimetal blade 38 in an amount sufficient to overcome the attraction of the magnet 46 for the ferrous stationary contact supporting member 62, the contacts 54 and 64 separate with a snap action, and with the stored energy in the curved portion 52 of the leaf spring contactor member 47 being effective to cause the button contact 54 to follow and break the arc between it and the contact 64. The deflecting of the opposite ends of the leaf spring contactor member 47 by the attraction of the magnet for the ferrous contact supporting member disposed thereabove further is effective to compensate for contact wear and maintain constant the adjustment of the contacts to provide a long life for the device. It will be observed that the armature 69 carried by the leaf spring member 68 follows the movement of the magnet 46 due to the fact that the attraction of the magnet for the armature 69 is greater than the return spring tension of the leaf spring member 68 so that in the position of the contacts of the switch as shown in Figure 12 the circuit through the running winding through the terminal 21 securing the bracket 65 in position on the base remains closed.

Upon opening of the starting winding circuit upon separation of contacts 54 and 64, the current flow will suddenly drop and effect cooling somewhat of the bimetal blade 38 and further deflection will not then take place. It will remain deflected, however, due to the current still flowing through the contacts 55 and 71 and through the running winding of the electric motor in sufficient amount to prevent the contacts 54 and 64 from reengaging. Now if a faulty condition comes upon the line, an excess of current will flow through the heater wire 34 and the bimetal blade 38 causing the blade to deflect more and more toward the base until the contact bar 73 of the armature 69 engages the upper ends of the projections 77—77 of the base member. When this occurs the armature 69 and the leaf spring 68 are prevented from further following the magnet 46 and upon continued deflection of the bimetal blade 38, carry the magnet 46 away from the armature 69 until the stored energy in the leaf spring 68 becomes sufficient to overcome the attraction of the magnet 46 whereupon the contacts 55 and 71 will separate with a snap action. When this occurs the button contact 55 at the free end of the curved outer portion 53 of the leaf spring contactor member 47 follows the contact 71 to break the arc. The running circuit is thus opened and the motor ceases to operate. The motor will remain disconnected until the bimetal blade 38 and the heater wire 34 cool off, permitting the bimetal blade 38 to flex to its normal position, and until the magnetic field of the magnet 46 is brought into proximity with the ferrous contact supporting members 62 and 73. When the magnetic pull reaches a predetermined amount due to the decreasing gap between the magnet 46 and the members 62 and 73, the magnet will snap the contacts 54 and 64, and 55 and 71 closed and complete the circuits through the terminals 20 and 21, so that the starting cycle for the motor may be again repeated. The laterally projecting ear 76 of the vertical arm 77 of the bracket 65 is positioned so as to make the gap between the contact supporting bar 73 of the armature 69 and the magnet 46 greater than the gap between the magnet 46 and the contact supporting portion 62 of the stationary contact member 60, so that on reclosing, the contacts 54 and 64 are caused to be reengaged just prior to reengagement of the contacts 55 and 71 to prevent the switch from cycling on the circuit through the terminal 21 connected to the running winding of the electric motor.

It will be observed due to the above described arrangement of the parts that the ambient temperature surrounding the switch aids the action of the heat due to the current flow through the heater wire 34 and the bimetal blade 38, thus protecting the device being controlled by the switch from being damaged due to too high surrounding ambient temperatures.

While I have shown what I consider to be the preferred embodiment of my invention, it will be understood that various modifications and rearrangements may be made therein without departing from the spirit and scope of my invention.

I claim:

1. A switch of the character described comprising a base member, a bimetal blade supported at one end upon said base member, a pair of first movable contacts carried by said bimetal blade at its other end, a pair of second contacts one being supported on said base in alignment with one of said first movable contacts and in stationary relation thereto, and the other of said second contacts being mounted in alignment with the other of said movable contacts for relative conjoint movement therewith, and magnetic means between said other end of said bimetal blade and said second contacts for biasing said first contacts into engagement with said second contacts, said bimetal blade upon predetermined current flow through said switch being adapted to flex in a direction to effect separation of said one first movable contact from said one second stationary contact against the force of said magnetic means, and stop means for arresting movement of said other of said second contacts with said other of said first movable contacts upon further increased predetermined current flow through said switch to effect separation of said last named contacts by said bimetal blade against the force of said magnetic means.

2. A switch of the character described comprising a base member, a bimetal blade supported at one end upon said base member, a pair of first movable contacts carried at the other end of said bimetal blade, a pair of second contacts one being supported on said base member in alignment with one of said first movable contacts and in stationary relation thereto, and the other of said second contacts being mounted in alignment with the other of said first movable contacts for relative conjoint movement therewith, and magnetic means including a permanent magnet carried at said other end of said bimetal blade for biasing said first contacts into engagement with said second contacts, said bimetal blade upon predetermined current flow through said switch being adapted to flex in a direction to effect separation of said one first movable contact from said second stationary contact against the force of said magnetic means, and stop means for arresting movement of said other of said second contacts with said other of said first movable contacts upon further increased predetermined current flow through said switch to effect separation of said last named contacts by said bimetal blade against the force of said magnetic means.

3. In a switch of the character described the combination of a bimetal blade fixed at one end and having a pair of first movable contacts at its other end, a pair of second contacts in alignment with said first movable contacts, one of said pair of second contacts being movable and the other thereof being stationary, magnetic means including a permanent magnet carried at said other end of said bimetal blade for biasing said first movable contacts into engagement with said second contacts, said bimetal blade being arranged so that when heated by current flow therethrough to flex in a direction away from said second contacts, and means associated with said second contacts adapted upon predetermined current flow through said bimetal blade to effect separation of one of said first movable contacts from said other of said second contacts against the force of said magnetic means, and upon further increased predetermined current flow through said bimetal blade to effect separation of the other of said pair of movable contacts from said one of said second contacts against the force of said magnetic means.

4. In a switch of the character described the combination of a bimetal blade fixed at one end and having a leaf spring contactor member at its other end provided with a pair of first movable contacts one at each of the ends thereof, a pair of second contacts, means for supporting said second contacts in alignment one each with one each of said first movable contacts, a permanent magnet carried at said other end of said bimetal blade and having attraction for said supporting means to deflect said leaf spring contactor member and bias said first movable contacts into engagement with said second contacts, said bimetal blade being arranged so that when heated by current flow therethrough said other end thereof flexes in a direction away from said second contacts, and means associated with said second contacts adapted upon predetermined current flow through said bimetal blade to effect separation of one of said movable contacts from said one of said second contacts against the force of said magnet, and upon further increased predetermined current flow through said bimetal blade to effect separation of said other of said movable contacts from the other of said stationary contacts against the force of said magnet.

5. A switch of the character described comprising a base member of insulating material, a bimetal blade supported at one end above said base member, a pair of first movable contacts fixed at the other end of said bimetal blade, a pair of second contacts, means for supporting one of said second contacts in stationary relation on said base in alignment with and overlying one of said first movable contacts, a bracket fixed to said base member, a leaf spring fixed at one end to said bracket member, an armature at the other end of said leaf spring supporting the other of said second contacts in alignment with and overlying the other of said first movable contacts, said bracket having stop means for limiting movement of said other second contact in a direction away from said other of said first movable contacts, a permanent magnet carried by said bimetal blade at its said other end having attraction for said supporting means and said armature to bias said contacts into engagement with each other, said bimetal blade being arranged so that when heated by predetermined current flow therethrough said other end thereof flexes in a direction toward said base member to effect separation of said one first movable contact from said one second contact against the force of said magnet, and stop means carried by said base member for arresting movement of said other second contact to effect separation thereof from said other of said first movable contacts upon further increased predetermined current flow through said bimetal blade member against the force of said magnet.

6. A switch of the character described comprising a base member of insulating material, a bimetal blade supported at one end above said base member, a leaf spring contactor member fixed to the other end of said bimetal blade and having a pair of first movable contacts one at each of the ends thereof, a pair of second contacts means for supporting one of said second contacts in stationary relation on said base in alignment with and overlying one of said first movable contacts, a bracket fixed to said base member, a leaf spring fixed at one end to said bracket, an armature at the other end of said leaf spring supporting the other of said second contacts in alignment with and overlying the other of said first movable contacts, said bracket having stop means for limiting movement of said other second contact in a direction away from said other of said first movable contacts, a permanent magnet carried by said bimetal blade at its said other end having attraction for said supporting means and said armature to deflect said leaf spring contactor member and bias said contacts into engagement with each other, said bimetal blade being arranged so that when heated by predetermined current flow therethrough said other end thereof flexes in a direction toward said base member to effect separation of said one of said first movable contact from said one second contact against the force of said magnet, and stop means carried by said base member for arresting movement of said other second contact to effect separation thereof from said other of said first pair of movable contacts upon further increased predetermined current flow through said bimetal blade against the force of said magnet.

7. A switch of the character described comprising a base member of insulating material, a bimetal blade supported at one end above said base member, a pair of first movable contacts fixed at the other end of said bimetal blade, a pair of second contacts, means for supporting one of said second contacts in stationary relation on said base member in alignment with and overlying one of said first movable contacts, a bracket fixed to said base member, a leaf spring fixed at one end to said bracket member, an armature at the other end of said leaf spring supporting the other of said second contacts in alignment with and overlying the other of said first pair of movable contacts, said bracket having stop means for limiting movement of said other second contact in a direction away from said other of said first movable contacts, a permanent magnet carried by said bimetal blade at its said other end having attraction for said supporting means and said armature to bias said contacts into engagement with each other, said bimetal blade being arranged so that when heated by predetermined current flow therethrough said other end thereof flexes in a direction toward said base member to effect separation of said one of said first movable contacts from said one second contact against the force of said magnet, stop means carried by said base member adapted to be engaged by said armature to arrest movement of said other second contact to effect separation thereof from said other of said first movable contacts upon further increased predetermined current flow through said bimetal blade member against the force of said magnet, and said stop means of said bracket providing for positioning of said other second contact so that upon cooling of said bimetal blade said one of said first pair of movable contacts reengages said one second contact prior to re-engagement of said other second contact with said other of said first pair of said movable contacts.

8. In a switch of the character described, a bimetal blade adapted to be supported at one end, a permanent magnet fixed at the other end of said bimetal blade having a groove therein extending in a direction lengthwise of said bimetal blade, a leaf spring contactor member fixed at said other end of said bimetal blade having curved end portions extending inwardly of the groove in said magnet, a contact carried by each of said curved end portions of said leaf spring contactor member, a pair of second contacts, means for supporting said second contacts one each in alignment with and overlying one each of the contacts carried by said leaf spring contactor member, said magnet being adapted to have attraction for said supporting means for said second contacts to deflect the opposite curved ends of the leaf spring contactor member inwardly of the groove in said magnet and to bias the contacts carried by said curved ends of said leaf spring contactor member into engagement with said second pair of contacts.

9. A switch of the character described comprising a base member of insulating material, a bimetal blade, a first bracket fixed to said base member and having one end of said bimetal blade fixed thereto for supporting the latter above said base member, a first pair of movable contacts fixed to the other end of said bimetal blade, a permanent magnet fixed to said other end of said bimetal blade, a pair of second contacts, means for supporting one of said second contacts in stationary relation on said base member in alignment with and overlying one of said first pair of said movable contacts, a second bracket fixed to said base member, a leaf spring member fixed at one end to said second bracket overlying said bimetal blade, an armature at the other end of said leaf spring supporting the other of said second contacts in alignment with and overlying the other of said first pair of movable contacts, said permanent magnet being adapted to have attraction for said supporting means and said armature to bias said first pair of movable contacts into engagement with said second contacts, said bimetal blade being arranged so that when heated by predetermined current flow therethrough said other end thereof flexes in a direction toward said base member to effect separation of said one of said movable contacts from said one second contact against the force of said magnet, and stop means carried by said base member adapted to be engaged by said armature to arrest movement of said other second contact to effect the separation therefrom of said other of said movable contacts upon further increased predetermined current flow through said bimetal blade against the force of said magnet, and an adjusting screw threaded in said first bracket for engagement at its free end with said base member for adjusting said bimetal blade.

10. A switch of the character described comprising, a base member of insulating material, a bimetal blade, a first bracket fixed to said base member and having one end of said bimetal blade fixed thereto for supporting the latter above said base member, a first terminal fixed to said base member, a heater wire extending from said first terminal to said first bracket, a pair of first movable contacts and a permanent magnet carried at the other end of said bimetal blade, a pair of second contacts, means for supporting one of said second contacts in stationary relation of said base member in alignment with and overlying one of said pair of first movable contacts, said supporting means providing a second terminal in said base member, a second bracket fixed in said base member by a third terminal member mounted in the latter, a leaf spring member fixed at one end to said second bracket to extend lengthwise of and overlie said bimetal blade, an armature at the other end of said leaf spring member supporting the other of said second contacts in alignment with and overlying the other of said first pair of movable contacts, said second bracket having means for limiting movement of said armature away from said base member, said magnet having attraction for said supporting means and said armature to bias said first pair of movable contacts into engagement with said second contacts, said bimetal member upon predetermined current flow therethrough being adapted to flex in a direction to effect separation of said one of said first pair of movable contacts from said one second contact against the force of said magnet, and stop means adapted to be engaged by said armature to prevent movement of said other second contact with said other of said first pair of movable contacts upon increased predetermined current flow through said bimetal blade to effect separation of last named contacts by said bimetal blade against the force of said magnet.

11. A switch of the character described comprising, a base member of insulating material, a bimetal blade, a first bracket fixed to said base member and having one end of said bimetal blade fixed thereto for supporting the latter above said base member, a first terminal fixed to said base member, a heater wire extending from said first terminal to said first bracket, a pair of first movable contacts and a permanent magnet carried at the other end of said bimetal blade, a pair of second contacts, means for supporting one of said second contacts in stationary relation on said base in alignment with and overlying one of said pair of first movable contacts, said supporting means providing second terminal in said base member, a second bracket fixed in said base member by a third terminal member mounted in the latter, a leaf spring member fixed at one end to said second bracket to extend lengthwise of and overlies said bimetal blade, an armature at the other end of said leaf spring supporting the other of said second contacts in alignment with and overlying the other of said first pair of movable contacts, said second bracket having means for engaging said armature to limit movement of said other second contact away from said base member, said magnet having attraction for said supporting means and said armature to bias said first pair of movable contacts into engagement with said second contacts, said bimetal member upon predetermined current flow therethrough being adapted to flex in a direction to effect separation of said one of said first pair of movable contacts from said one second contact against the force of said magnet, and stop means adapted to be engaged by said armature to prevent movement of said other second contact with said other of said first pair of movable contacts upon increased predetermined current flow through said bimetal blade to effect separation of said last named contacts by said bimetal blade against the force of said magnet, and an adjusting screw threaded in said first bracket for engagement at its free end with said base member for adjusting the position of said bimetal blade.

12. In a switch of the character described a bimetal blade adapted to be supported at one end, a permanent magnet fixed at the other end of said bimetal blade having a groove therein extending in a direction lengthwise of said bimetal blade, a leaf spring contactor member fixed at said other end of said bimetal blade to extend lengthwise thereof and having curved end portions extending inwardly of the opposite ends of the groove in said magnet, a first pair of movable contacts one each being carried by each of said end portions of said leaf spring contactor member, a pair of second contacts, means for mounting one of said second contacts in stationary relation in alignment with and overlying the contact carrier by the inner curved end portion of said leaf spring contactor member, means including a leaf spring member fixed at one end and supporting at its other end the other of said second contacts in alignment with and overlying the contact carried at the outer curved end of said leaf spring contactor member, said permanent magnet being adapted to have attraction for said supporting means and said means including the leaf spring member to bias said first pair of movable contacts into engagement with said second contacts, said bimetal blade upon predetermined current flow through said switch being adapted to flex in a direction to effect separation of said one second contact and the contact carried by the inner curved end portion of said leaf spring contactor member against the force of said magnet, and stop means for arresting movement of said other second contact with the contact at the outer end of said leaf spring contactor member upon further increased predetermined current flow through said bimetal blade to effect separation of said last named contacts by said bimetal blade against the force of said permanent magnet.

13. In a switch of the character described a bimetal blade adapted to be supported at one end, a permanent magnet fixed at the other end of said bimetal blade having a groove therein extending in a direction lengthwise of said bimetal blade, a leaf spring contactor member fixed at said other end of said bimetal blade to extend lengthwise thereof and having curved end portions extending inwardly of opposite ends of the groove in said magnet, a pair of first movable contacts one each being carried by one each of said curved end portions of said leaf spring contactor member, a pair of second contacts, means for supporting one of said second contacts in stationary relation in alignment with and overlying the contact carried by the inner curved end portion of said leaf spring contactor member, a bracket having one end of a leaf spring member fixed thereto for supporting the same in overlying relation with respect to the bimetal blade, an armature at the other end of said leaf spring member supporting the other of said second contacts in alignment with and overlying the other of said first pair of movable contacts carried at the outer curved end of said leaf spring contactor member, said bracket having stop means for limiting movement of said other second contact away from said other of said first pair of said movable contacts, said magnet having attraction for said supporting means and said armature to bias said first pair of said movable contacts into engagement with said second contacts, said bimetal blade upon predetermined current flow therethrough being adapted to flex in a direction to effect separation of said one of said first pair of movable contacts from said one second contact against the force of said magnet, and stop means adapted to be engaged by said armature to prevent movement of said other second contact with said other of said first pair of movable contacts upon increased predetermined current flow through said bimetal blade to effect separation of said last named contacts by the latter against the force of said magnet.

14. A switch of the character described comprising, a base member of insulating material, a bimetal blade, a first bracket fixed to said base member and having one end of said bimetal blade fixed thereto for supporting the latter above said base member, a first terminal fixed to said base member, a heater wire extending from said first terminal to said first bracket, a permanent magnet fixed at the other end of said bimetal blade having a groove therein extending in a direction lengthwise of said bimetal blade, a leaf spring contactor member fixed at said other end of said bimetal blade to extend lengthwise thereof and having curved end portions extending inwardly of opposite ends of the groove in said magnet, a pair of first movable contacts one each being carried by one each of said curved end portions of said leaf spring contactor member; a pair of second contacts, means for mounting one of said second contacts in stationary relation in alignment with and overlying the contact carried by the inner curved end portion of said leaf spring contactor member, a second bracket fixed in said base member by a third terminal member mounted in the latter, a leaf spring member fixed at one end to said second bracket to extend lengthwise of and overlie said bimetal blade, an armature at the other end of said leaf spring supporting the other of said second contacts in alignment with and overlying the other of said first pair of movable contacts, said second bracket having means for engaging said armature to limit movement of said other second contact away from said base member, said magnet having attraction for said supporting means and said armature to bias said first pair of movable contacts into engagement with said second contacts, said bimetal member upon predetermined current flow therethrough being adapted to flex in a direction to effect separation of said one of said first pair of movable contacts from said one second contact against the force of said magnet, stop means adapted to be engaged by said armature to prevent movement of said other second contact with said other of said first pair of movable contacts upon increased predetermined current flow through said bimetal blade to effect separation of said last named contacts by said bimetal blade against the force of said magnet, and an adjusting screw threaded in said first bracket for engagement at its free end with said base member for adjusting the position of said bimetal blade.

ROBERT E. PROUTY.

REFERENCES CITED

The following references are of record in the file of this patent:

UNITED STATES PATENTS

| Number | Name | Date |
|---|---|---|
| 2,236,282 | Ayers | Mar. 25, 1941 |
| 2,260,838 | Lynch | Oct. 28, 1941 |
| 2,295,340 | Fiene | Sept. 8, 1942 |
| 2,417,911 | Carlson | Mar. 25, 1947 |